(12) United States Patent
Ham

(10) Patent No.: US 8,622,831 B2
(45) Date of Patent: Jan. 7, 2014

(54) RESPONSIVE CUTSCENES IN VIDEO GAMES

(75) Inventor: Richard Allen Ham, Guildford (GB)

(73) Assignee: Microsoft Corporation

( * ) Notice: Subject to any disclaimer, the term of this patent is extended or adjusted under 35 U.S.C. 154(b) by 1307 days.

(21) Appl. No.: 11/766,483

(22) Filed: Jun. 21, 2007

(65) Prior Publication Data

US 2008/0318676 A1  Dec. 25, 2008

(51) Int. Cl.
G06F 17/00 (2006.01)
(52) U.S. Cl.
USPC .................................. 463/36; 463/9; 463/31
(58) Field of Classification Search
USPC ........................ 463/1, 9, 31, 36, 42
See application file for complete search history.

(56) References Cited

U.S. PATENT DOCUMENTS

| | | | |
|---|---|---|---|
| 4,305,131 A | 12/1981 | Best | 364/521 |
| 5,679,075 A | 10/1997 | Forrest et al. | 463/9 |
| 6,364,666 B1 | 4/2002 | Jenkins et al. | 434/156 |
| 6,544,040 B1 | 4/2003 | Brelis et al. | 434/236 |
| 7,155,158 B1 | 12/2006 | Iuppa et al. | 434/350 |
| 2003/0144045 A1 * | 7/2003 | Fujita | 463/1 |
| 2004/0038739 A1 | 2/2004 | Wanat | 463/36 |
| 2004/0147324 A1 | 7/2004 | Brown | 463/42 |
| 2005/0278642 A1 | 12/2005 | Chang et al. | 715/751 |
| 2006/0040718 A1 | 2/2006 | Davis | 463/9 |
| 2006/0119598 A1 | 6/2006 | Littlefield | 345/419 |
| 2006/0148545 A1 | 7/2006 | Rhyene, IV et al. | 463/1 |
| 2006/0252533 A1 | 11/2006 | Sakaguchi et al. | 463/31 |

FOREIGN PATENT DOCUMENTS

| | | |
|---|---|---|
| KR | 10-2005-0120389 | 12/2005 |
| KR | 10-2007-0024918 | 3/2007 |

OTHER PUBLICATIONS

Search Report and Written Opinion of the International Searching Authority in corresponding PCT application PCT/US2008066649. Filed Jun. 12, 2008.
Davy McCarthy, Spider-Man 3: The Game, http://www.eurogamer.net/article.php?article_id=75561, pp. 1-2, Apr. 20, 2007.
Cutscene, http://tvtropes.org/pmwiki/pmwiki.php/Main.Cutscene, pp. 1-3, Apr. 27, 2007.
Jerome Cukier, Cutscenes and dialogues, http://www.gamethink.net/Cutscenes-and-dialogues.html, pp. 1-3, Jun. 19, 2006.
Call of Duty 3 Review (Xbox 360), http://www.gaminglife.com.au/, pp. 1-7, Dec. 19, 2006.
Steve Wisdom, Miami Vice: The Game—Article, http://www.deeko.com/psp/previewDetail.asp?id-613, pp. 1-2, Jun. 6, 2006.
Office Action from corresponding Chinese application 200880021070.8, mailed Apr. 26, 2012.
First Office Action from corresponding Chinese application 200880021070.8, mailed May 19, 2011.
Office Action from corresponding Israeli application 201706.

\* cited by examiner

Primary Examiner — Michael Cuff
(74) Attorney, Agent, or Firm — Kelly, Holt & Christenson, PLLC

(57) ABSTRACT

A determination is made that a player's avatar has performed an action while an audio signal representing a narrative of a non-player character is being produced. The action is mapped to an impression, which is mapped to a response. The audio signal is stopped before it is completed and the response is played by providing audio for the non-player character and/or animating the non-player character. After the response is played, steps ensure that critical information in the narrative has been provided to the player.

11 Claims, 6 Drawing Sheets

RESPONSIVE CUTSCENES IN VIDEO GAMES

BACKGROUND

Video games typically include an avatar, which is a character or object in the game that is controlled by a player, and non-player characters, which are controlled by the game. In many games, the player's avatar is able to interact with non-player characters such that the non-player characters will respond to actions taken by the player's avatar. For example, if a player's avatar attacks a non-character player, the non-character player may counter attack or run away.

Within video games, it is common for developers to include audio and video segments known as cutscenes that provide narrative information such as a story line for the game, contextual information for playing the game, or instructions for proceeding forward in the game. Traditionally, such cut scenes interrupted the game and took away the player's control of their avatar. Such cut scenes provide a movie-like experience where the player simply watches the action in the cut scene. Some video games have allowed the player to continue to control their avatar during the cut scene. However, actions taken by the avatar during such cut scenes are ignored by the non-player characters in the cut scene. Thus, the non-player characters do not interact with the player's avatar during the cut scene and seem to become robotic.

The discussion above is merely provided for general background information and is not intended to be used as an aid in determining the scope of the claimed subject matter.

SUMMARY

A determination is made that a player's avatar has performed an action while an audio signal representing a narrative of a non-player character is being produced. The action is mapped to an impression, which is mapped to a response. The audio signal is stopped before it is completed and the response is played by providing audio for the non-player character and/or animating the non-player character. After the response is played, steps ensure that critical information in the narrative has been provided to the player.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
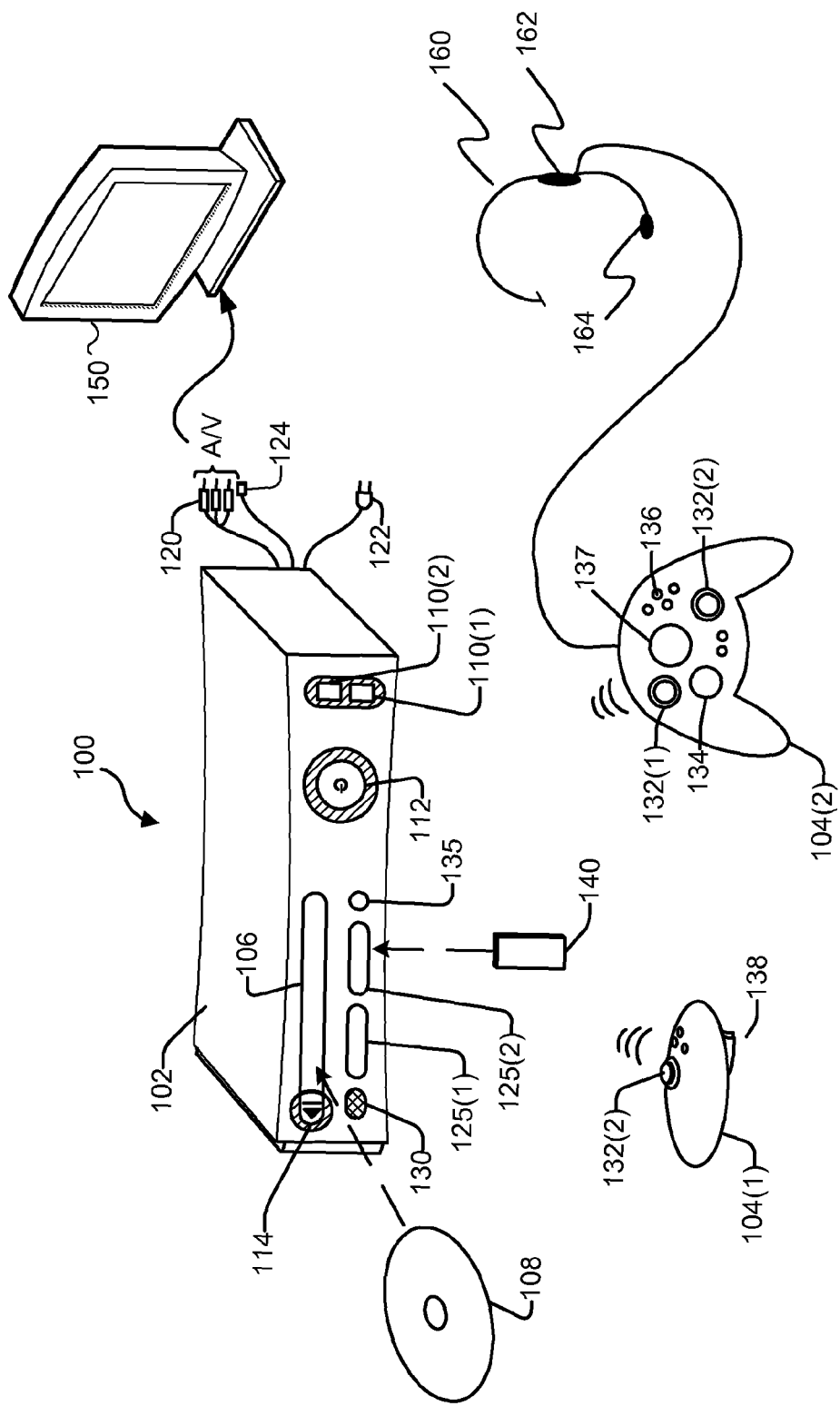
FIG. 1 is a perspective view of a gaming console.

FIG. 1 shows an exemplary gaming and media system 100. The following discussion of this Figure is intended to provide a brief, general description of a suitable environment in which certain methods may be implemented.

As shown in FIG. 1, gaming and media system 100 includes a game and media console (hereinafter "console") 102. Console 102 is configured to accommodate one or more wireless controllers, as represented by controllers 104(1) and 104(2). A command button 135 on console 102 is used create a new wireless connection between on of the controllers and the console 102. Console 102 is equipped with an internal hard disk drive (not shown) and a media drive 106 that supports various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140.

Console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (not shown) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet.

Each controller 104 is coupled to console 102 via a wired or wireless interface. In the illustrated implementation, the controllers are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, User Guide button 137 and two triggers 138. By pressing and holding User Guide button 137, a user is able to power-up or power-down console 102. By pressing and releasing User Guide button 137, a user is able to cause a User Guide Heads Up Display (HUD) user interface to appear over the current graphics displayed on monitor 150. The controllers described above are merely representative, and other known gaming controllers may be substituted for, or added to, those shown in FIG. 1.

Controllers 104 each provide a socket for a plug of a headset 160. Audio data is sent through the controller to a speaker 162 in headset 160 to allow sound to be played for a specific player wearing headset 160. Headset 162 also includes a microphone 164 that detects speech from the player and conveys an electrical signal to the controller representative of the speech. Controller 104 then transmits a digital signal representative of the speech to console 102. Audio signals may also be provided to a speaker in monitor 150 or to separate speakers connected to console 102.

In one implementation (not shown), a memory unit (MU) 140 may also be inserted into one of controllers 104(1) and 104(2) to provide additional and portable storage. Portable MUs enable users to store game parameters and entire games for use when playing on other consoles. In this implementation, each console is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from optical disk media (e.g., 108), from an online source, from a peripheral storage device connected to USB connections 110 or from MU 140.

Figure 2:
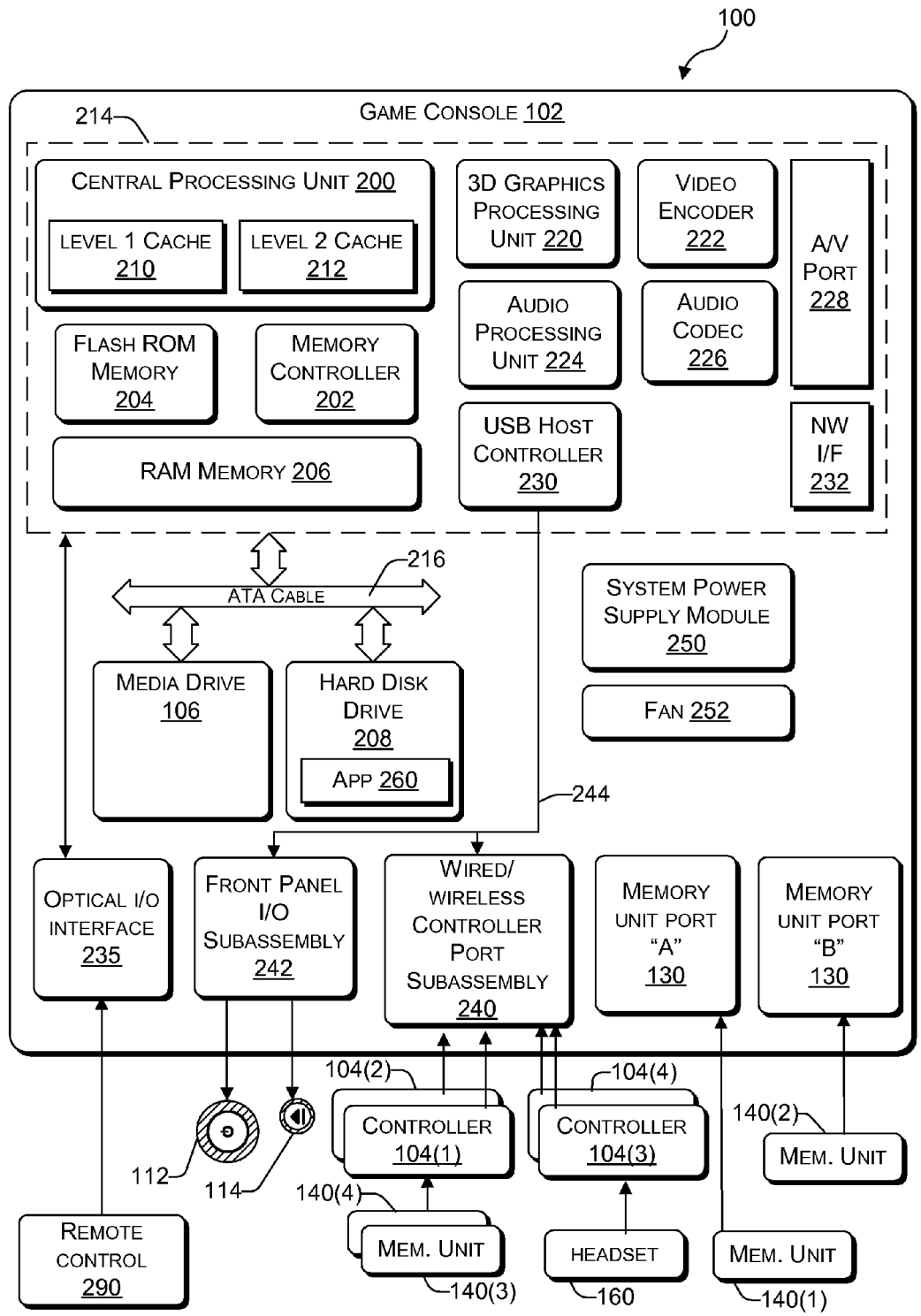
FIG. 2 is a block diagram of components of a gaming console.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and media drive 106. In one implementation, CPU 200 includes a level 1 cache 210, and a level 2 cache 212 to temporarily store data and hence reduce the number of memory access cycles made to the hard drive, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a Peripheral Component Interconnect (PCI) bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and media drive 106 are shown connected to the memory controller via the PCI bus and an AT Attachment (ATA) bus 216. However, in other implementations, dedicated data bus structures of different types can also be applied in the alternative.

In some embodiments, ROM 204 contains an operating system kernel that controls the basic operations of the console and that exposes a collection of Application Programming Interfaces that can be called by games and other applications to perform certain functions and to obtain certain data.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display containing one or more speakers. Some audio data formed by audio processing unit 224 and audio codec 226 is also directed to one or more headsets through controllers 104. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a Bluetooth module, a cable modem, and the like.

In the implementation depicted in FIG. 2, console 102 includes a controller support subassembly 240, for supporting up to four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(4)) are illustrated as being connectable to controller 104(1), i.e., two MUs for each controller. Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

Headset 160 is shown connected to controller 104(3). Each controller 104 may be connected to a separate headset 160.

A system power supply module 250 provides power to the components of gaming system 100. A fan 252 cools the circuitry within console 102.

Under some embodiments, an application 260 comprising machine instructions is stored on hard disk drive 208. Application 260 provides a collection of user interfaces that are associated with console 102 instead of with an individual game. The user interfaces allow the user to select system settings for console 102, access media attached to console 102, view information about games, and utilize services provided by a server that is connected to console 102 through a network connection. When console 102 is powered on, various portions of application 260 are loaded into RAM 206, and/or caches 210 and 212, for execution on CPU 200. Although application 260 is shown as being stored on hard disk drive 208, in alternative embodiments, application 260 is stored in ROM 204 with the operating system kernel.

Gaming system 100 may be operated as a standalone system by simply connecting the system to monitor, a television 150 (FIG. 1), a video projector, or other display device. In this standalone mode, gaming system 100 enables one or more players to play games, or enjoy digital media, e.g., by watching movies, or listening to music. However, with the integration of broadband connectivity made available through network interface 232, gaming system 100 may further be operated as a participant in a larger network gaming community allowing, among other things, multi-player gaming.

The console described in FIGS. 1 and 2 is just one example of a gaming machine that can be used with various embodiments described herein. Other gaming machines such as personal computers may be used instead of the gaming console of FIGS. 1 and 2.

Figure 3:
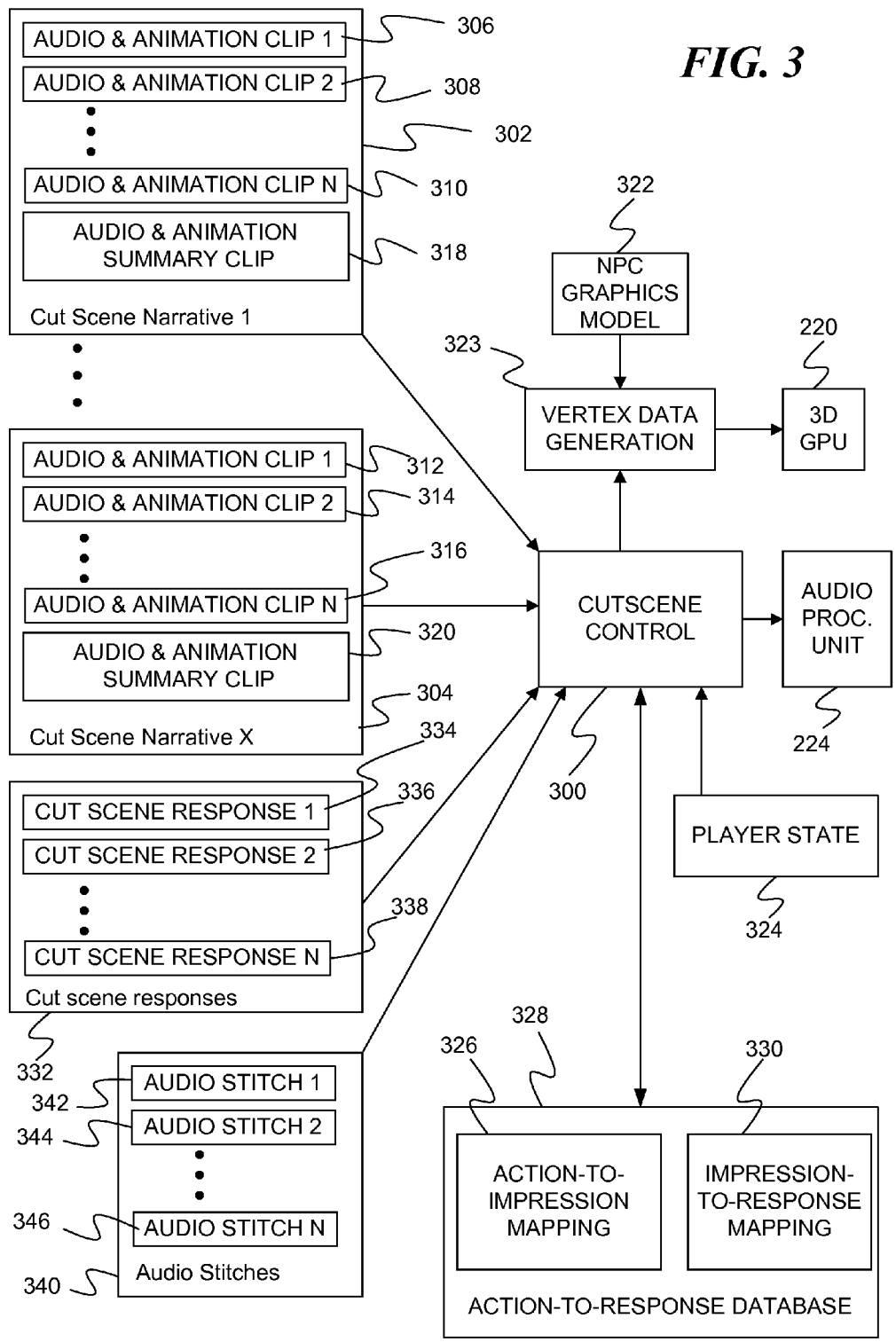
FIG. 3 is a block diagram of elements in a gaming console used for responsive cutscenes.
Figure 4:
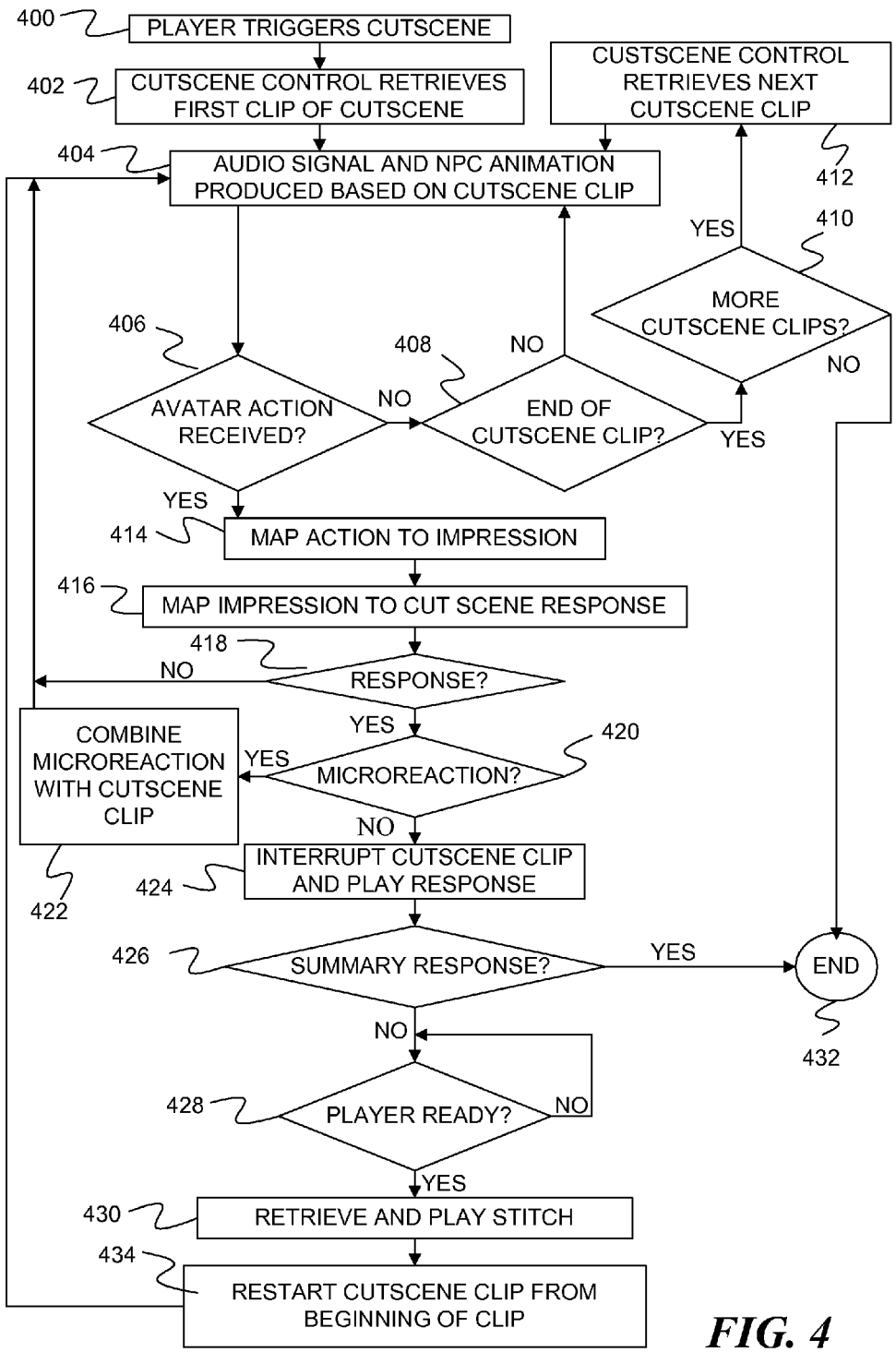
FIG. 4 is a flow diagram of a method of providing responsive cut scenes.

FIG. 3 provides a block diagram of elements used in a method shown in FIG. 4 for producing responsive cutscenes that respond to actions by a player's avatar while still conveying critical information of a narrative.

Figure 5:
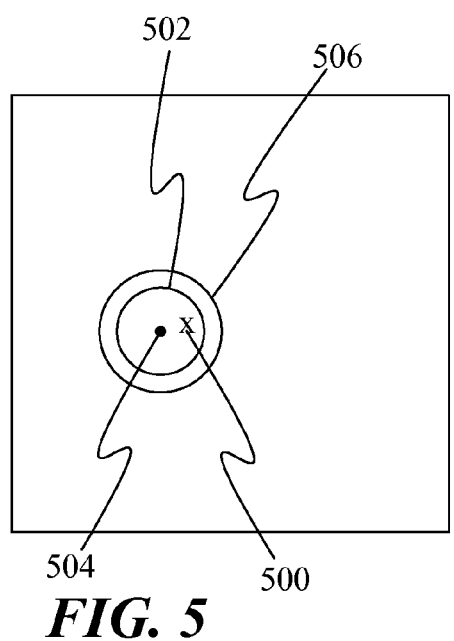
FIG. 5 is a top perspective view of a gaming world.
Figure 6:
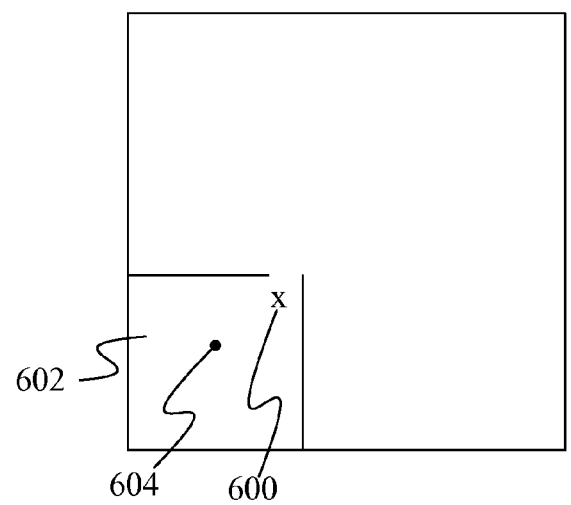
FIG. 6 is a top perspective view of a second embodiment of a gaming world.

At step 400 of FIG. 4, a player triggers the cutscene. As shown in the top perspective view of a gaming environment in FIG. 5, a player can trigger a cutscene under some embodiments by placing their avatar within a circumference 502 of a non-player character 504. In other embodiments, the player can trigger the cutscene by placing the player's avatar 600 within a same room 602 as a non-player character 604 as shown in the top perspective view of a gaming environment in FIG. 6. Other techniques for triggering a cutscene include a player completing one or more tasks or selecting to initiate a cutscene using one or more control buttons.

After the player triggers the cutscene, cutscene control 300 of FIG. 3 is started and retrieves a first clip of the cutscene at step 402 of FIG. 4.

Under one embodiment, each cutscene is divided into a plurality of clips. Each clip includes an audio signal representing speech from a non-player character as well as animation descriptors that describe how the non-player character should be animated during the playing of the clip. Under one embodiment, each clip is a WAV file with a header that describes the animation for the non-player character.

In FIG. 3, a plurality of cutscenes is shown including cutscene 302 and cutscene 304. Each of the cutscenes includes a plurality of clips. For example, cutscene 302 includes clips 306, 308 and 310 and cutscene 304 includes clips 312, 314 and 316. In addition, each cutscene includes a summary clip such as summary clip 318 of cutscene 302 and summary clip 320 of cutscene 304. These summary clips are described further below.

As noted below, dividing each cutscene into clips allows the cutscene to be broken into natural breakpoints where the cutscene can be restarted if a cutscene clip is interrupted by an action by the player's avatar. By restarting the cutscene at the beginning of the clip that was interrupted, a more natural restart of the cutscene is provided and helps to make the non-player character appear more realistic.

At step 404 of FIG. 4, an audio signal and non-player character animation are produced based on the selected cutscene clip. Under one embodiment, to produce the animation, cut scene control 300 provides the animation information for the non-player character to a vertex data generation unit 323. Vertex data generation unit 323 uses the animation information and a graphical model 322 of the non-player character to generate a set of vertices that describe polygons. The vertices are provided to 3D graphics processing unit 220, which uses the vertices to render polygons representing the non-player character in the graphical three-dimensional gaming environment. The rendered polygons are transmitted through video encoder 222 and A/V port 228 of FIG. 2, to be displayed on an attached display screen. The audio signal for the non-player character is provided to audio processing unit 224, which then generates an audio signal through audio code 226 and A/V port 228 of FIG. 2.

Figure 7:
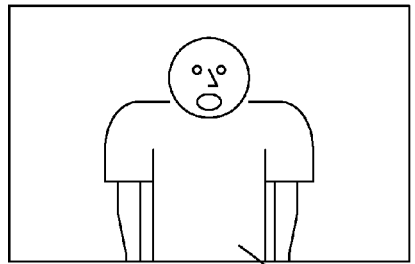
FIG. 7 is a screen shot of a non-player character providing a narrative in a cutscene.

FIG. 7 provides a screen shot showing a non-player character 700 that is providing a cut scene narrative during step 404.

At step 406, cutscene control 300 examines player state data 324 to determine if the player's avatar has performed an action. Examples of actions include attacking the non-player character, moving a threshold distance away from the non-player character, or performing other actions supported by the game. Under one embodiment, these other actions include things such as belching, performing a silly dance, flexing an arm, performing a rude hand gesture, and faking an attack on the non-player character. Such actions are referred to herein as expressions.

Figure 8:
FIG. 8 is a screen shot showing a menu of expressions that the player's avatar may make.

Under one embodiment, a player may select an action from a list of actions listed in a menu. FIG. 8 provides an example of a screen shot showing a possible menu 800 of actions that the player's avatar may perform. The player causes the menu to be displayed by either selecting an icon on the display or using one or more controls on the controller. Once the menu has been displayed, the player may select one of the actions from the menu using the controller. In other embodiments, actions may be mapped to one or more controls on the controller so that the player does not have to access the menu.

Under some embodiments, the action may include the player's avatar moving more than a threshold distance away from the non-player character. For example, in FIG. 5, the player's avatar may move outside of circumference 506 and in FIG. 6, the player's avatar may move outside of room 602. In both situations, such movement will be interpreted as an action by cut scene control 300.

If cut scene control determines that the player's avatar has not performed an action at step 406, it determines if the end of the current cutscene clip has been reached at step 408. If the end of the current cutscene clip has not been reached, cutscene control 300 continues producing the audio signal and non-player character animation by returning to step 404. Steps 404, 406 and 408 continue in a loop until an avatar action is received at step 406 or the end of a cutscene clip is received at step 408. If the end of the cut scene clip is reached at step 408, the process continues at step 410 where cutscene control 300 determines if there is another clip for the cutscene. If there is another clip for the cutscene, the next clip is retrieved at step 412, and the audio signal and non-player character animation found in the clip is used to animate the non-player character and produce an audio signal for the non-player character.

If cut scene control 300 determines that the player's avatar has performed an action at step 406, it maps the action to an impression at step 414 using an action-to-impression mapping 326 in an action-to-response database 328. An impression is the way that a non-player character will interpret the action. For example, a non-player character may interpret an action as being scary, insulting, impolite, funny, friendly, aggressive, inattentive, or impatient, each of which would be a possible impression. At step 416, cutscene control 300 maps the impression to a response using impression-to-response mapping 330 of action-to-response database 328. By performing two mapping functions, one from an action to an impression, and another from an impression to a response, embodiments described herein allow cutscene responses to be designed without needing to know all possible actions that may be performed. Instead, a limited number of impressions can be specified and cutscene responses can be produced for those impressions. This also allows actions to be added later without affecting the currently produced responses. Multiple actions may be mapped to a single impression in action-to-impression mapping 326 and multiple impressions may be mapped to a single response in impression-to-response mapping 330.

At step 418, cutscene control 300 determines if a response has been identified through the impression-to-response mapping in step 416. Under some embodiments, an impression may map to no response so that the non-player character will ignore the action taken by the player's avatar. If no response is to be provided at step 418, the process returns to step 404 where the audio signal and non-player character animation continues for the cutscene clip. Note that although steps 406, 414, 416 and 418 appear to occur after step 404 in the flow diagram of FIG. 4, during steps 406, 414, 416 and 418, the audio signal and animation of the current cutscene clip continues to be output by cutscene control 300. Thus, there is no interruption in the cutscene while these steps are being performed.

If the mapping of step 416 identifies a response, the response is retrieved from a set of stored responses 332, which include cut scene responses 334, 336, and 338, for example. The cut scene responses include animation information for movement of the non-player character and/or an audio signal containing dialog that represent the non-player characters response to the action of the player's avatar. In some embodiments, the cut scene responses also include "scripting hooks" that indicate directorial types of information such as directions to the non-player character to move to a particular location, movement of the camera, lighting effects, background music and sounds, and the like.

At step 420, the response is examined to determine if the response is a microreaction. Such information can be stored in a header of the response or can be stored in action-to-response database 328. A microreaction is a small animation or small change in tone of the audio signal that does not interrupt the audio signal and non-player character animation of the cutscene clip, but instead slightly modifies it as it continues. If the response is a microreaction at step 420, the microreaction is combined or integrated with the cut scene clip at step 422. This can involve changing the tone of the audio signal of the cut scene by either raising or lowering the pitch or by adding additional animation features to the cutscene animation. If an animation is added, the audio signal of the cut scene continues without interruption as the microreaction animation is integrated with the cut scene animation.

Figure 9:
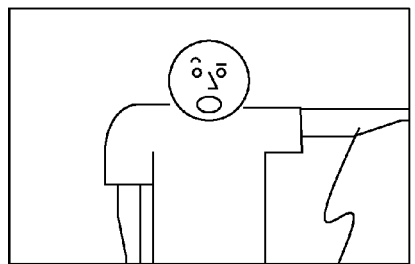
FIG. 9 is a screen shot showing a combination of a microreaction response and an animation for a cutscene.

For example, in FIG. 9, the cutscene clip includes an animation in which the non-player character points to his left using his left arm 900. Normally, during this animation, the non-player character's eyebrows would remain unchanged. However, based on a microreaction response to an avatar action, the right eyebrow of the non-player character is raised relative to the left eyebrow to convey that the non-player character has detected the action taken by the avatar and that the impression left with the non-player character is that the avatar is doing something slightly insulting.

If the response found during mapping step 416 is more than a microreaction at step 420, cutscene control 300 interrupts the cut scene clip and plays the cut scene response. Under one embodiment, the cut scene response is played by providing the animation information to vertex data generation unit 323, which uses the animation information and NPC graphics model 322 to generate sets of vertices representing the movement of the non-player character. Each set of vertices is provided to 3D graphics processing unit 220, which uses the vertices to render an animated image of the non-player character. The audio data associated with the response is provided to audio processing unit 224.

Figure 10:
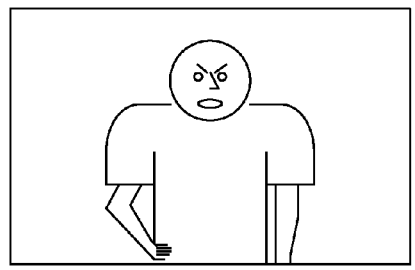
FIG. 10 is a screen shot of a non-player character showing an angry response.
Figure 11:
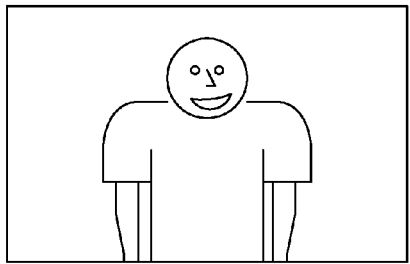
FIG. 11 is a screen shot of a non-player character showing a happy response.
Figure 12:
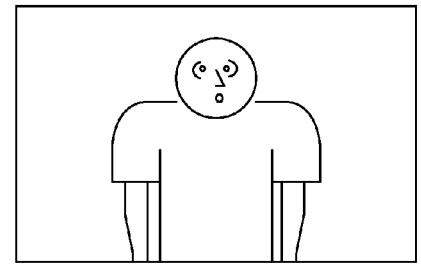
FIG. 12 is a screen shot of a non-player character showing a scared response.

FIG. 10 provides an example of a cutscene response in which the non-player character is animated to indicate that the impression of the avatar's action was highly insulting to the non-player character and made the non-player character angry. FIG. 11 shows a cutscene response in which the non-player character smiles to indicate that the impression of the avatar's action is that it was funny to the non-player character and in FIG. 12, the cutscene response indicates that the impression of the non-player character is that the avatar's action was scary. Not all responses require both audio and animation. In some embodiments, the non-player character will be silent during the cutscene response and simply be animated to reflect the impression of the avatar's action. In other embodiments, the visual appearance of the non-player character will not change during the response other than to synchronize the non-player character's mouth to the audio response.

Under some embodiments, a player is able to activate a summary clip of the cut scene by taking an action that conveys an impression of impatience. For example, the player may select an action in which their avatar requests "just the facts", and this action will be mapped to an impatience impression. The impression-to-response mapping 330 will in turn map the impatience impression to a summary response. Under one embodiment, such summary clips are stored together with the other clips of the cut scene. In other embodiments, the summary clips may be stored with the cut scene responses 332. The summary clip contains audio data and animation information that causes the non-player character to summarize the critical information that was to be conveyed by the cutscene. In general, cutscenes contain both critical information and stylistic information wherein the critical information is required for the player to advance through the game and the stylistic information is provided to convey an emotional or stylistic attribute to the game. Under one embodiment, the summary clip strips out most of the stylistic information to provide just the critical information.

Since playing the summary clip ensures that the player has been given all of the critical information of the cut scene narrative, once the summary clip has been played, there is no need to continue with the cut scene.

As such, at step 426, cut scene control 300 determines if the response is a summary response and ends the cutscene procedure at step 432 if the response was a summary response.

If the response was not a summary response, cut scene control 300 examines player state 324 to determine if the player is ready to continue with the cut scene clip at step 428. For example, if the player's avatar has not returned to the non-player character after moving away from the non-player character, cut scene control 300 will determine that the player is not ready to continue with the cut scene clip. Under one embodiment, cut scene control 300 will set a timer if the player is not ready to continue with the cut scene. Cut scene control will then loop at step 428 until the player is ready to continue with the cut scene or until the timer expires. If the timer expires, cut scene control will unload the current cut scene such that the player will have to trigger the cut scene from the beginning again.

When the avatar is ready to continue with the cut scene clip, for example by coming back to the non-player character, cut scene control 300 retrieves and plays an audio stitch from a collection of audio stitches 340 at step 430. Audio stitches 340 include a collection of audio stitch files such as audio stitch files 342, 344 and 346. Each audio stitch file includes audio and animation data for the non-player character that provides an audio and visual segue between the response and restarting the cut scene clip that was interrupted at step 424. Examples of audio stitches include "as I was saying", "if you are finished", and "now then". Such audio stitches provide a smooth transition between a response and the resumption of the cut scene clip.

At step 434, the cut scene clip that was interrupted at step 424 is restarted from the beginning of the cut scene clip. By restarting the cut scene clip, cut scene control 300 ensures that the critical information of the cut scene narrative is provided to the player. In most cases, restarting the cut scene clip will involve reproducing the audio signal and animations that were played when the cut scene clip was initially started. The process then returns to step 404 to continue playing of the cutscene clip and to await further avatar actions.

In other embodiments, instead of playing an audio stitch file and restarting the cut scene clip that was interrupted, cut scene control 300 will select an alternate cut scene clip to play instead of the interrupted cut scene clip. After playing the alternate cut scene clip, the process continues at step 412 by selecting a next cut scene clip of the cut scene to play. In such embodiments, the alternate cut scene clip and the next cut scene clip are selected to insure that the critical information of the cut scene is still provided to the player.

The process of FIG. 4 continues until a summary response is played, there are no more cutscene clips at step 410, or a timeout occurs during step 428.

In the discussion above, the detection of an avatar action was shown as only occurring at step 406. However, in other embodiments, cutscene control 300 is event driven such that at any point in the flow diagram of FIG. 4, cut scene control 300 may receive an indication from player state 324 that the avatar has taken an action. Based on that action, cutscene control 300 may map the action to an impression, map the impression to a cutscene response as shown at steps 414 and 416 and produce an animation and audio signal based on the new response. Thus, in the process of playing one response, cutscene control 300 may interrupt that response to play a different response based on a new avatar action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
retrieving a cutscene clip file comprising dialog for a non-player character in a game, the dialog forming at least part of a cutscene that provides a complete narrative comprising critical information and stylistic information to be conveyed to a player;
producing an audio signal representing speech from the non-player character based on the dialog in the retrieved cutscene clip file;
determining that the player's avatar has performed an action while the audio signal is being produced;
mapping the action to an impression the non-player character has of the action, wherein the impression of the action is that the player's avatar is impatient;
mapping the impression that the player's avatar is impatient to a summary response;
stopping the audio signal for the retrieved cutscene clip file before all of the dialog in the retrieved file has been produced as an audio signal;
playing the summary response to produce an audio signal representing speech from the non-player character that is a summarized version of the complete narrative and that comprises all critical information found in the complete narrative with less stylistic information than is found in the complete narrative, thereby ensuring that the critical information of the narrative is provided to the player; and
after playing the summary response, ending the cutscene without completing the audio signal for the retrieved cutscene clip file.

2. The method of claim 1 wherein multiple actions are mapped to a single impression.

3. The method of claim 1 wherein the retrieved file comprises one of a plurality of files that together form the complete narrative.

4. A computer-readable medium having computer-executable instructions for performing steps comprising:
determining that a player of a game has triggered a cutscene containing critical information required for the player to advance through the game and stylistic information to convey a stylistic attribute to the game;
accessing a cutscene clip file containing data representing an audio signal and animated movements for a non-player character in a game, the audio signal and the animated movements corresponding to the non-player character speaking to a player's avatar;
playing part of the cutscene clip file;
determining that the player's avatar in the game has performed an action;
mapping the action to an impression;
mapping the impression to a summary response;
retrieving the summary response from a set of stored responses;
stopping the cutscene clip file before all of the dialog in the cutscene clip file has been produced as an audio signal;
playing the summary response to produce an audio signal representing speech from the non-player character, the summary response comprising all the critical information of the cutscene but less stylistic information than the cutscene, thereby ensuring that the critical information of the cutscene is provided to the player; and
after playing the summary response, immediately ending the cutscene at the end of the summary response.

5. The computer-readable medium of claim 4 wherein mapping an action to an impression comprises mapping the action to an impression that is not limited to being mapped to by only one action.

6. The computer-readable medium of claim 4 wherein the impression is the way a non-player interprets the action.

7. The computer-readable medium of claim 6 wherein the non-player character interprets the action as being impatient.

8. The computer-readable medium of claim 4 wherein the steps further comprise examining a header of the response to determine if it is a microreaction, wherein a microreaction combines animated movement in the cutscene clip file with animated movement of a response to form modified animations for the non-player character.

9. A method comprising:
   a player triggering a cutscene;
   a cutscene control retrieving one of a plurality of cutscene clips that together constitute the cutscene, each cutscene clip having a start and an end;
   producing an audio signal and an animation for a non-player character from the retrieved cutscene clip;
   determining that a player's avatar has performed an action;
   determining that the non-player character should respond to the action;
   stopping the cutscene clip before reaching the end of the cutscene clip;
   having the non-player character respond to the action by summarizing critical information that is in the plurality of cutscene clips while stripping out most stylistic information in the plurality of cutscene clips;
   upon completing the response, immediately ending the cutscene.

10. The method of claim 9 wherein determining that a non-player character should respond to an action comprises mapping the action to an impression and mapping the impression to a response.

11. The method of claim 9 wherein the action comprises the player's avatar asking for just the facts.

\* \* \* \* \*